W. S. SHAW.
SOLE CUTTING MACHINE.
APPLICATION FILED JUNE 5, 1920.
1,408,537.
Patented Mar. 7, 1922.
2 SHEETS—SHEET 1.
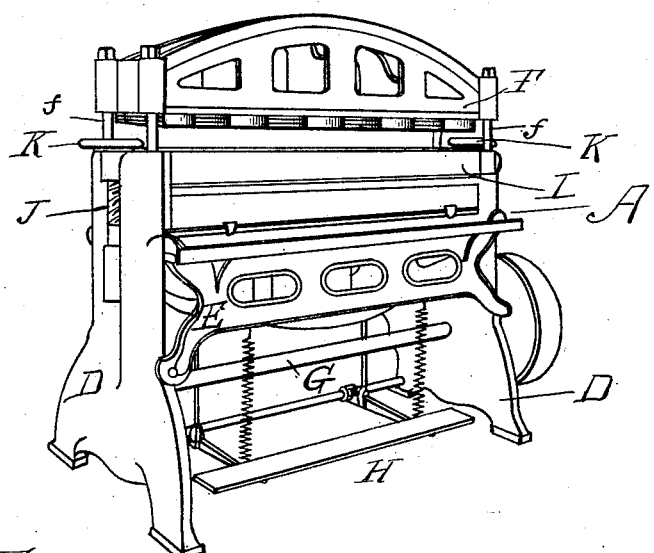
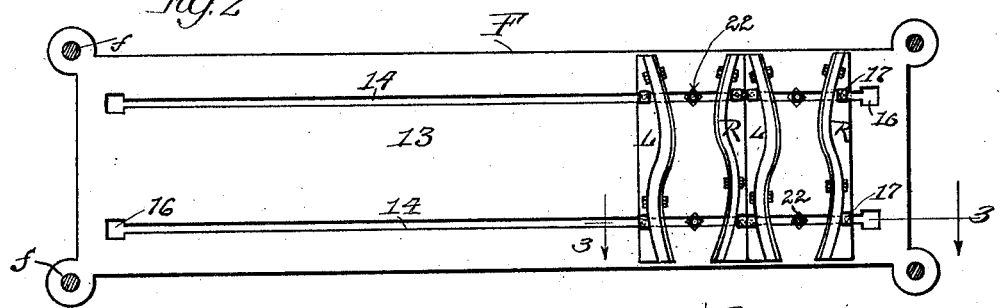
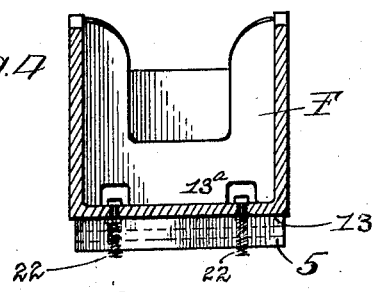
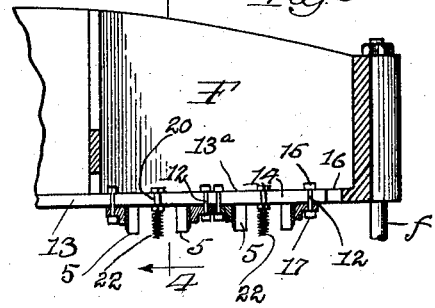
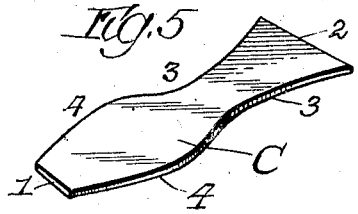
Inventor
William S. Shaw,
By Taylor Brown Atty

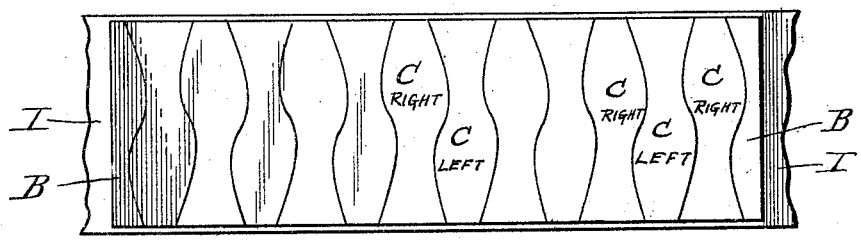
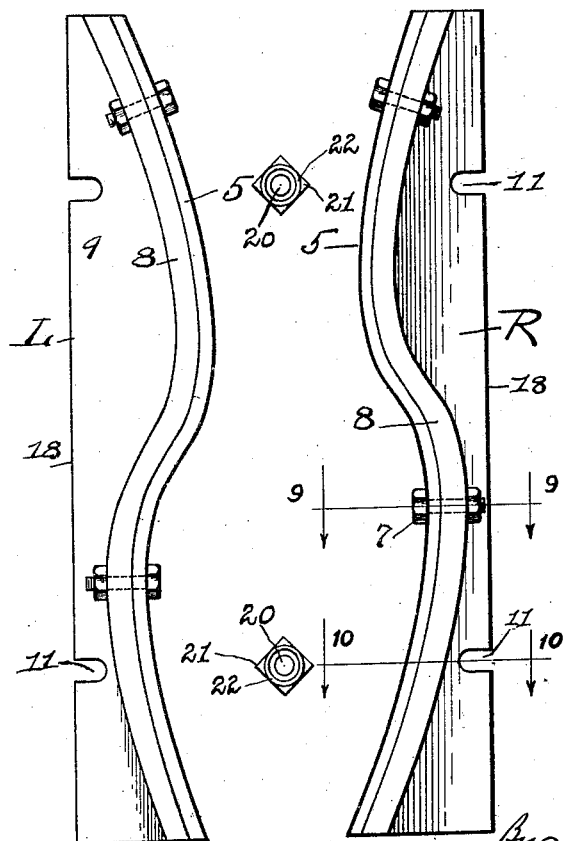
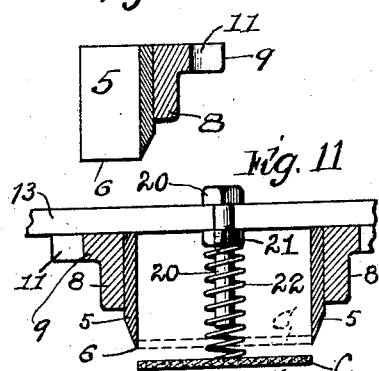

UNITED STATES PATENT OFFICE.

WILLIAM S. SHAW, OF CHICAGO, ILLINOIS.

SOLE-CUTTING MACHINE.

1,408,537.

Specification of Letters Patent.   Patented Mar. 7, 1922.

Application filed June 5, 1920. Serial No. 386,701.

*To all whom it may concern:*

Be it known that I, WILLIAM S. SHAW, a citizen of the United States, residing at Chicago, in the county of Cook and State of Illinois, have invented certain new and useful Improvements in Sole-Cutting Machines, of which the following is a specification, reference being had to the accompanying drawings, and to the reference characters marked thereon, which form a part of this specification.

This invention relates to new and useful improvements in sole-leather cutting machines and has for its principal object to provide in what is commonly known as a "beam" sole-leather cutting machine, suitable means for simultaneously cutting a plurality of soles, both rights and lefts, with the minimum of waste leather, and with the maximum of speed, while practically eliminating the danger heretofore attendant upon the operation of cutting out soles. Also to provide a machine in which the leather to be operated upon may be quickly and accurately placed in operative position and which may be operated effectively by unskilled labor, such as a boy or girl with very little practice.

The machines generally in use for cutting out soles employ a movable die or knife movable by hand to operative position over the leather, from which the sole is to be cut, and after the reciprocation of the power operated "beam," the die is shifted to another position on the leather and the operation is repeated, one sole being thus cut from the leather with each descent of the beam. The operation of such machines is not only attended with considerable danger to the operator but requires the operator to be specially skilled in order to properly position the die or knife for each succeeding cut to avoid waste of material. With my machine, these difficulties and objections are overcome.

These and other objects of my invention will be more fully comprehended by reference to the accompanying drawings, as I proceed with my specification.

In said drawings:

Fig. 1 is a perspective view of a machine embodying my invention.

Fig. 2 is an under or bottom plan view, enlarged, of that face of the beam on which the cutting knives or dies are adjustably mounted.

Fig. 3 is a longitudinal vertical sectional view of a portion of this beam, taken in the plane indicated by the dotted line 3—3 of Fig. 2.

Fig. 4 is a transverse vertical sectional view of the same, taken in the plane indicated by the dotted line 4—4 of Fig. 3.

Fig. 5 is a perspective view of a sole after being cut from the leather strip by my machine.

Fig. 6 is a diagrammatic view showing a strip of leather on the cutting table with full lines indicating six pairs of soles to be cut therefrom.

Figs. 7 and 8 are enlarged plan views of a pair of cutting knives, and the angle blocks to which they are respectively secured.

Fig. 9 is a transverse vertical sectional view of one of the latter, taken in the plane of the line 9—9 of Fig. 8.

Fig. 10 is a similar view taken in the plane of the line 10—10 of Fig. 8.

Fig. 11 is a similar view showing a clearing device for the cutters.

In said drawings, A represents the machine as a whole, B the strip of leather and C a sole cut therefrom. The machine comprises side frame members D, connecting girth members, the front one being shown at E, a reciprocating beam member F, supported upon rods $f, f$, an operating rotatable power driven shaft G, an operating presser foot member H and a bed plate or cutting table I upon which the strip of leather to be operated upon may be placed. It will be understood that suitable means (not forming per se any part of the present invention and therefore not illustrated) will be employed for so connecting the power shaft G with the beam F and the presser foot H as to cause the beam F to be reciprocated once with each operation of the presser foot; that is to say, the beam will descend toward the table I to perform the cutting operation and then be returned to its original or raised position, from which latter it will not move until the presser foot be again actuated by the operator.

Any suitable means may be employed for giving the table I any desired vertical adjustment, as for example, the rods J controlled by a hand wheel K.

The soles C, as noted in Fig. 5, have a straight toe or front end margin 1 and a straight back margin 2, parallel with the front margin. The side margins are curved with a concave portion 3 and a convex portion 4. The cutting knives 5 each provided with a sharp cutting edge 6 are made in pairs,—rights and lefts, and are each provided with suitable apertures through which bolts 7 may be passed. These bolts extend through suitable apertures in the vertical flange member 8 of a backing plate 9 and a nut 10 on the bolt 7 clamps the knife and the plate firmly together. Of course, as many of these bolts 7 may be used as desired, but I find that two are ordinarily sufficient for the purpose. The front face of the flange 8 conforms to the concavo-convex shape of the cutting knife 5, as clearly shown in Figs. 7 and 8. In that portion of the backing plate outside of the flange 8, I provide suitable bolt slots 11 through which bolts 12 may be passed to secure said backing plate and knife 5 to the under surface 13 of the reciprocating beam F. In the surface 13 are parallel slots 14, 14, which extend longitudinally of the beam. These slots are of a width adapted to receive and hold the bolts 12. The bolt heads 15 of the bolts 12 are of course larger than the width of the slots 14 and in order that the bolts 12 may be positioned in said slots, the latter are provided preferably at each end with an enlarged slot or opening 16, through which the bolt heads 15 are first passed to the side 13$^a$, and the bolt 12 is then moved into the slot 14 through which it depends downwardly as shown in Fig. 3. The angle backing plate 9 is then positioned, the bolts passing through the slots 11 thereof and the backing plate and knife secured in proper position by the nut 17.

Two cutters 5 complementally arranged, constitute a pair required to cut the sole C. These are shown, in juxtaposition, in Figs. 7 and 8,—that shown in Fig. 7 being the left and that in Fig. 8 being the right for a given sole. This pair of knives and their respective backing blocks I designate as a whole by the letters L and R.

The outer margin 18 of each block 9 is preferably a straight edge, for convenience in adjusting a plurality of pairs of L and R cutters to the surface 13. In setting the cutters (see Fig. 2) on the machine, I place the R cutter (Fig. 8) at the extreme right hand end, say, and the L cutter next to it in the relative positions of Figs. 7 and 8, care being taken to have the cutting surfaces 6 such distance apart as may be necessary to cut the sole C the right size. Then a similar R cutter is placed in the machine, with its straight edge 18 adjacent the edge 18 of the already positioned first mentioned L cutter. Then a second L cutter is put into the machine and adjusted with respect to the cutting edge 6 of the second R cutter, just as the first L cutter was adjusted to the first R cutter; and so on until the desired number of pairs of L and R cutters have been adjusted, by means of the bolts and slots to the surface 13 of the beam F.

The leather strip B to be cut up into soles is then placed upon the table I and the presser foot H operated, whereupon the beam F will descend and the cutting knives L and R will cut out all the right soles C.

The width of the backing plates 9 of the cutters is such, ordinarily, that when an L cutter is placed back to back with an R cutter, so that the edges 18 meet, the distance between the cutting edges 6 of an L cutter and an R cutter is such as to leave between them a piece of leather the exact shape of the sole C, but for a left instead of a right sole. Thus the pair of L and R cutters, while in fact in one operation cutting out a plurality of right soles, automatically leave between the soles thus cut an equal number of left soles. This is indicated by the diagrammatic view of Fig. 6, where each alternate sole is a right and the intermediate one a left.

It will be noted that by this arrangement of the cutters, a very small amount of scrap leather is left, namely: the end pieces b, b. The leather strip B, before being placed in the machine, is preferably cut to the desired length for forming four, five or six pairs of soles, and of a width equal to the length of the sole C—that is, equal to the distance between the margins 1 and 2.

Where it is desired to make soles of different widths, the L and R cutters may be so bolted or adjusted that the straight edges 18, 18, will not meet when the cutters are placed back to back, or the knives may be bolted to the backing plates 9 of different widths. In shop practice, it is found convenient to have different sets of L and R cutters made up, with the backing plates 9 of different sizes, so that the edges 18, 18, will be designed to meet when adjusted for operation. The backing plates 9 may be made of cast or wrought metal, but in either event are so shaped as to conform to the desired contour of the knives F.

When the cutters 5, 5, stamp out a sole C, the latter is apt to remain frictionally in contact therewith, and suitable clearance or stripping devices will be employed to cause a disengagement of the cut-out soles C, C, when the cutters are withdrawn on the return stroke. Such a device is illustrated in Fig. 11, wherein a headed bolt 20 is held by a lock nut 21 to the beam F. In the instance shown, the bolt is in the slot 14. A spring 22 is secured at its upper end to the bolt 20 with the lower end floating below the bolt end and below the plane of the cutting edges 6 of the knives 5. When the latter pierce through the leather, the spring will be compressed and when the beam F is raised, the spring 22 will expand and push the blank sole C from the position shown in dotted lines in Fig. 11 to that shown in full lines therein.

Preferably two of these clearing devices will be used for each sole cut, and the bolts may be secured by any suitable means other than the slots 14. The slots 11 in the angle plate 9 will also afford means for positioning the bolt 20.

In operation, after the desired number of pairs of L and R cutters are adjusted to the surface 13 of the reciprocating beam F by the machinist or operator, the cutting of soles may be accomplished by unskilled labor, without danger of injury to the operator. A leather strip B is placed in the machine upon the table I, the presser foot H actuated, a plurality of soles, rights and lefts, are formed by the first cutting operation. As before stated, the connection between the driving shaft G, the presser foot H and the beam F are such that but a single cutting action occurs with one operation of the presser foot H. As soon as the beam F is raised to its original position, the operator simply pushes a second strip B into the machine upon the table I. The act of inserting the second strip B automatically pushes the cut soles and waste strips b, b, off from the table I, where they may fall into some convenient receptacle. The operator does not have to put his hand in the space between the table I and the cutters in placing the leather strip B in position, or in removing the cut out soles, and therefore there is no danger of accident or injury due to the accidental or unintentional operation of the presser foot H, as not infrequently occurs in other types of machines.

The operation of the machine is simple and rapid, as the operator is continuously at work reaching for and moving a second strip B to the machine while the first one is being cut. One of the advantages of the machine is its durability, due to the fact that the beam is equipped with only right-sole dies so spaced that in performing the cutting operation for the right soles, the left soles are formed in the same operation. The capacity of the machine is thus increased and the wear and tear on the cutting edges is reduced fifty per cent.

I claim as my invention:

1. A sole cutting machine comprising a work holding table, a vertically reciprocating beam, there being a plurality of parallel slots extending lengthwise of and through the face of said beam, a plurality of pairs of cutter knives, each pair being adapted to cut a right (or left) sole, means cooperating with said slots for adjustably securing the cutter knives to said beam so that the space between the proximate knives of adjacent pairs will outline a left (or right) sole.

2. A sole cutting machine comprising a work holding table, a vertically reciprocating beam carrying cutting knives, there being a plurality of parallel slots through the face of the beam extending lengthwise thereof, each slot being of a size to receive the shank of a bolt and an enlarged or bolt head opening at the end of each slot whereby the cutting knives may be adjustably secured to the face of said beam.

3. In a sole cutting machine having a vertically reciprocating beam and a work holding table, there being a plurality of parallel slots extending lengthwise of, and through the face of the beam, a plurality of pairs of cutting knives, each pair being adapted to cut a right (or left) sole, means cooperating with said slots for adjustably securing said knives to said beam in pairs so that the space between the proximate knives of adjacent pairs will outline a corresponding left (or right) sole at each cutting operation, said means including a resilient part secured to the beam with the free end of said part depending below the plane of the cutting edges of said knives.

4. In a sole cutting machine having a movable beam having longitudinally disposed slots through the face thereof, a cutting knife comprising a blade proper and an angle backing block having complemental surfaces, means for securing the cutter blade to its block, and means cooperating with said slots for securing the cutting knife to the beam.

In testimony, that I claim the foregoing as my invention I affix my signature, in the presence of two witnesses, this 3rd day of June, 1920.

WILLIAM S. SHAW.

Witnesses:
B. L. MacGregor,
L. A. Perlow.